US010765248B2

(12) United States Patent
Ma et al.

(10) Patent No.: US 10,765,248 B2
(45) Date of Patent: Sep. 8, 2020

(54) INTELLIGENT COOKING MACHINE

(71) Applicants: Yiming Ma, Guangzhou (CN);
Shuxiong Yan, Brooklyln, NY (US)

(72) Inventors: Yiming Ma, Guangzhou (CN);
Shuxiong Yan, Brooklyln, NY (US)

(*) Notice: Subject to any disclaimer, the term of this patent is extended or adjusted under 35 U.S.C. 154(b) by 219 days.

(21) Appl. No.: 16/021,339

(22) Filed: Jun. 28, 2018

(65) Prior Publication Data

US 2019/0365134 A1    Dec. 5, 2019

(30) Foreign Application Priority Data

May 29, 2018    (CN) .......................... 2018 1 0532455

(51) Int. Cl.
*A47J 27/00* (2006.01)
*A47J 43/04* (2006.01)
*A47J 36/32* (2006.01)

(52) U.S. Cl.
CPC ............. *A47J 27/004* (2013.01); *A47J 43/04* (2013.01); *A47J 36/32* (2013.01)

(58) Field of Classification Search
CPC .. A47J 36/32; A47J 36/00; A47J 36/34; A47J 27/004; A47J 27/002; A47J 43/04; A47J 43/288; A47J 47/00
See application file for complete search history.

(56) References Cited

FOREIGN PATENT DOCUMENTS

CN    109199081    *    1/2019

* cited by examiner

*Primary Examiner* — Shawntina T Fuqua
(74) *Attorney, Agent, or Firm* — Enshan Hong; VLP Law Group LLP (57) ABSTRACT

An intelligent cooking machine, comprising a top cover device, a base and a main control device, in which the top cover device is located above the base and is provided with a main material feeding device, a complementary material feeding device, a sauce feeding device, a cooking oil feeding device and a dressing feeding device, the main material feeding device is provided with a weighing sensor, and the weighing sensor is connected with the main control device to generate weight information of main materials contained in the main material feeding device and to allow the main control device to comprehensively control various feeding devices. Arrangement of various feeding devices of the invention is more scientific, comprehensive and reasonable, material feeding is more intelligent and controllable, the cooking effect is better, and the automation, integration and intelligence levels are higher.

15 Claims, 11 Drawing Sheets

Fig. 14

INTELLIGENT COOKING MACHINE

BACKGROUND OF THE INVENTION

1. Field of the Invention

The present invention relates to the field of kitchen appliance technologies, particularly to an intelligent cooking machine that can cook automatically.

2. Description of the Related Art

It has been thousands of years of evolution and inheritance for human beings to transform raw food into delicacies. Chinese food enjoys a global reputation and is widely favored. However, it is difficult to cook Chinese foods. The cooking process is complex, and different operation habits of different persons lead to varied tastes. Although Chinese cooking technologies seem inscrutable, no matter how complex they are, they can be summarized into three key elements: 1. proportion of main materials and complementary materials and correct use of various seasonings; 2. heat control in different phases; 3. reasonable time control. Different combinations of the three elements result in a great variety of food tastes and nutritional ingredients.

People have been looking for a way for turning complex traditional cooking methods into simple, easy-to-learn and effective ones. With the vigorous development of Internet and computer technologies, the wish is gradually being turned into a reality. Currently, a lot of automatic kitchen products have been launched in the market, like automatic domestic cookers and cooking robots. However, kitchen automation is in the initial phase by far when many product technologies are still immature, and the realization schemes are defective, so most of the products are semi-automatic with redundant and complex structures, huge sizes and single functions, and they usually can only realize simple stir-frying.

SUMMARY OF THE INVENTION

This invention provides an intelligent cooking machine with more scientific and reasonable layout of various parts, which can improve the automation and integration level as well as users' experience at least to some extent. The invention is realized through the following technical scheme: an intelligent cooking machine, comprising a top cover device, a base and a main control device, wherein the top cover device is located above the base and is provided with a main material feeding device, a complementary material feeding device, a sauce feeding device, a cooking oil feeding device and a dressing feeding device, the main material feeding device is provided with a weighing sensor, and the weighing sensor is connected with the main control device to generate weight information of main materials contained in the main material feeding device and to allow the main control device to comprehensively control various feeding devices.

Preferably, a cooking pot connecting frame, a cooking pot, a spatula, a first motor, a second motor, a first driving device, a second driving device and a fixed shaft are arranged in the base; the cooking pot connecting frame is sleeved outside and fixes the cooking pot the form a pot body, the spatula is located in the cooking pot, the first and second motors are fixed relative to the base and respectively and independently controlled by the main control device, the first motor drives the pot body to move through the first driving device, the second motor drives the spatula to move through the second driving device, the driving shafts of the first and second driving devices and the fixed shaft are respectively connected with the two ends of the pot body and are arranged in the same axial line, and the driving shaft of the first driving device is movably sleeved outside the driving shaft of the second driving device.

Preferably, the top cover device is connected with the base through a lifting device, and the main control device allows the top cover device to move upward or downward relative to the base through the lifting device.

Preferably, the main material feeding device comprises a main material feeding box frame, a main material feeding box bottom plate, a weighing platform and a main material feeding box driving device; the main material feeding box frame is cut through vertically, the main material feeding box bottom plate is arranged on the weighing platform and located below the main material feeding box frame, the weighing sensor is located between the main material feeding box bottom plate and the weighing platform, and the main control device enables the weighing platform to slide relative to the main material feeding box frame through the main material feeding box driving device, so that the main material feeding box bottom plate moves slowly to open or close the bottom opening of the main material feeding box frame.

Preferably, the complementary material feeding device comprises a complementary material feeding box frame, a complementary material feeding box bottom plate and a complementary material feeding box driving device; the complementary material feeding box frame is cut through vertically, the complementary material feeding box bottom plate is fixed relative to the top cover device and located below the complementary material feeding box frame, the main control device enables the complementary material feeding box frame to slide relative to the complementary material feeding box bottom plate through the complementary material feeding box driving device, so that the complementary material feeding box bottom plate moves slowly to open or close the bottom opening of the complementary material feeding box frame.

Preferably, the first and second motors are located on the same side of the pot body.

Preferably, the intelligent cooking machine also comprises a baffle plate which is vertically arranged in the complementary material feeding box frame.

Preferably, the intelligent cooking machine also comprises a nozzle cleaning assembly which is located in the base at the cleaning position of the pot body and is controlled by the main control device.

Preferably, a fume containing cavity is arranged at the bottom of the top cover device and communicated with the outside through a fume pipeline, the fume pipeline is provided with a filtering device and an air exhausting device, and the air exhausting device is controlled by the main control device.

The invention has the following advantages: 1) the arrangement of various feeding devices is more scientific, comprehensive and reasonable; 2) material feeding is more intelligent and controllable; 3) the cooking effect is better;) the automation, integration and intelligence levels are higher; 5) proper arrangement of various components in the base results in simplified machine structure, smaller occupied space and scientific layout of related components; 6) arrangement of the lifting device makes the machine structure more flexible, which further reduces space occupation, avoids raw materials from spilling and scattering around, and helps keep the cooking area clean and sanitary.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

The foregoing object, features, and advantages herein will become clearer and more understandable upon reading the following detailed description of the present invention by referencing to the drawings and embodiments.

In the figures, the numbers are respectively corresponding to the following components: the rack assembly 1, the cooking pot connecting frame 2, the cooking pot 3, the cooking pot driving shaft 4, the cooking pot driving shaft bearing 5, the spatula driving shaft bearing 6, the cooking pot rotation driving gear 7, the cooking pot rotation driving reduction motor 8, the spatula assembly 9, the spatula driving shaft 10, the spatula rotation driving gear 11, the spatula rotation driving reduction motor 12, the right driving shaft bearing 13, the right driving shaft 14, the right driving shaft bearing seat 15, the touch screen workbench assembly 16, the top cover assembly 17, the nozzle cleaning assembly 18, the water collecting tank 19, the electric lifting rods 20, the food discharging door 21, the food dreg collecting tray 22, the dressing storage tank 23, the food basin 24, the top cover rack assembly 171, the left material feeding box frame 172, the left material feeding box frame driving gear 173, the right material feeding box frame driving gear 174, the right material feeding box frame 175, the material feeding box edge sealing cover plate 176, the weighing platform driving gear 177, the weighing platform 178, the main material feeding box bottom plate 179, the main material feeding box frame 1710, the movable material feeding box door 1711, the cotton filter 1712, the air exhaust fan 1713, the left sauce storage tank 1714, the electric valve 1715, the left sauce storage tank cover 1716, the air outlet cover 1718, the weight sensor 1719, the air exhaust port 1720, the sauce outlet 1721, the cooking oil injection outlet 1722 and the dressing injection outlet 1723.

Figure 1:
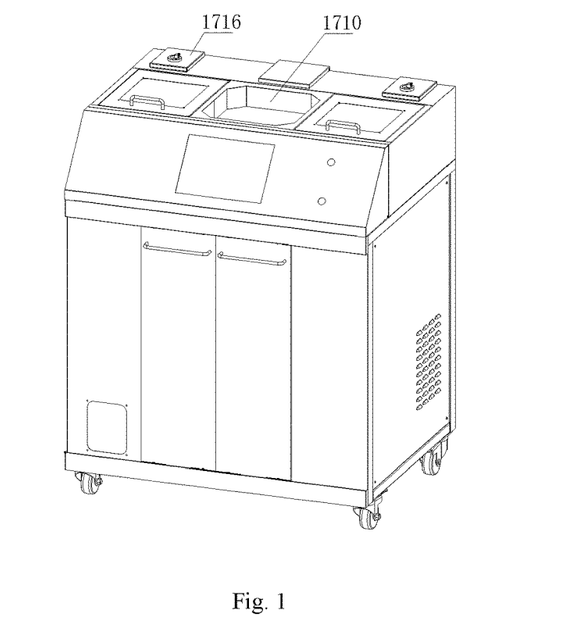
FIG. 1 shows the structural diagram of an embodiment of the invention.
Figure 2:
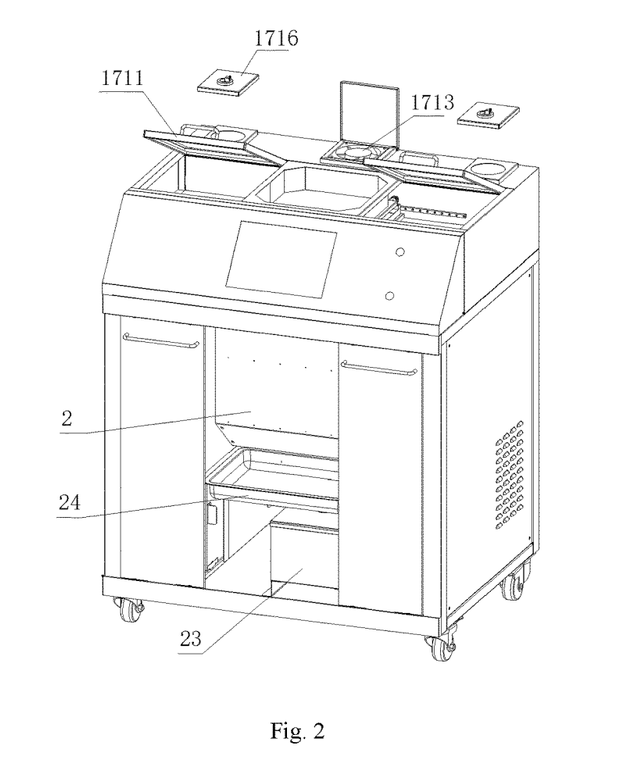
FIG. 2 shows the structural diagram of the partially open state in FIG.1.
Figure 3:
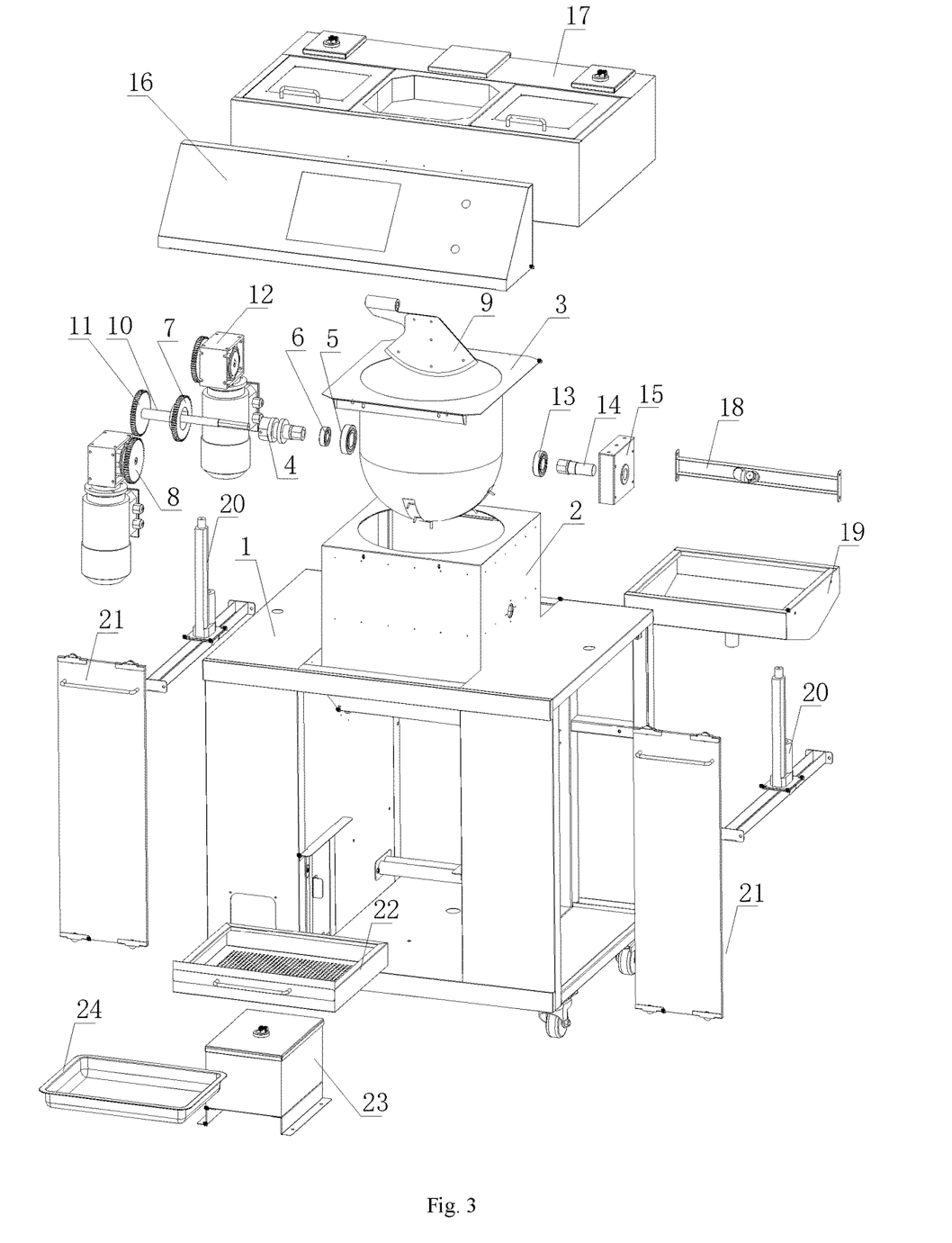
FIG. 3 shows the partially explosive view in FIG. 1.
Figure 4:
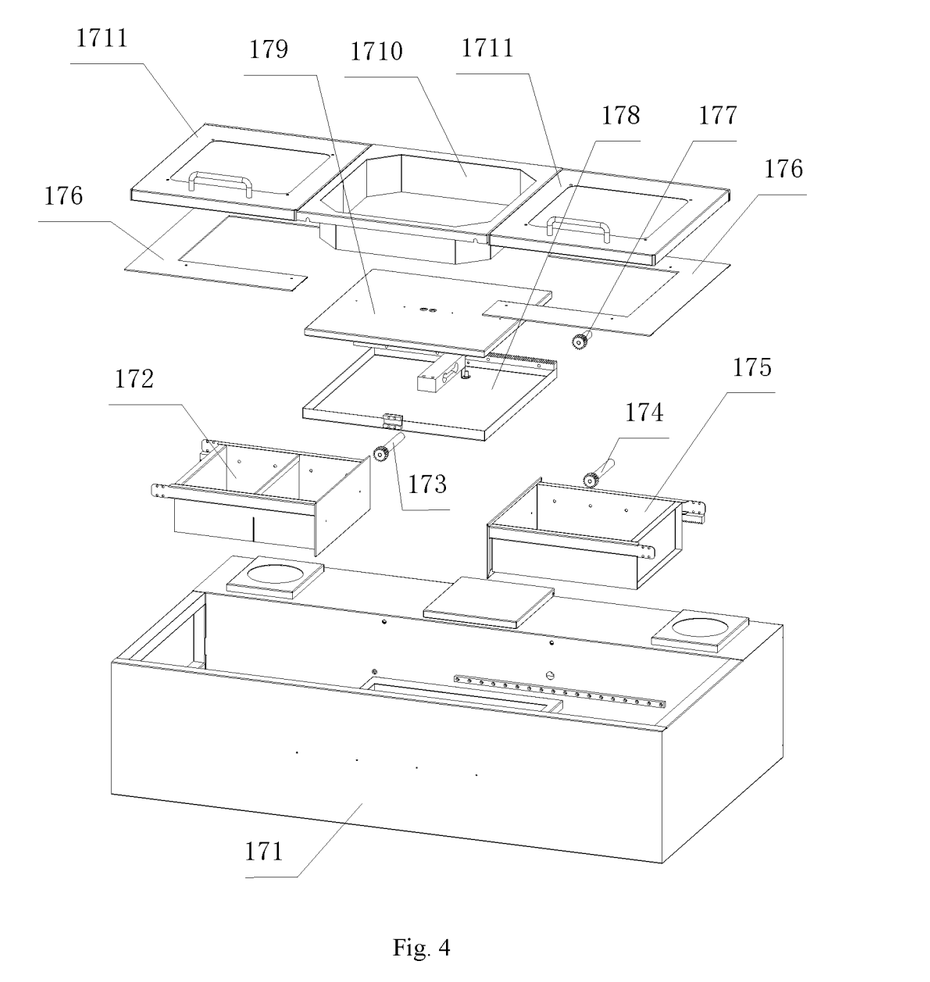
FIG. 4 shows the explosive view of the top cover assembly in FIG. 3.
Figure 5:
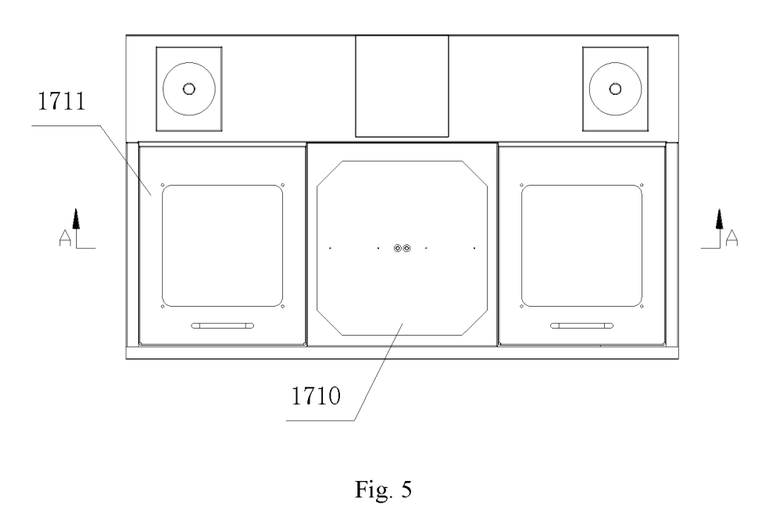
FIG. 5 shows the top view of the top cover assembly in FIG. 3.
Figure 6:
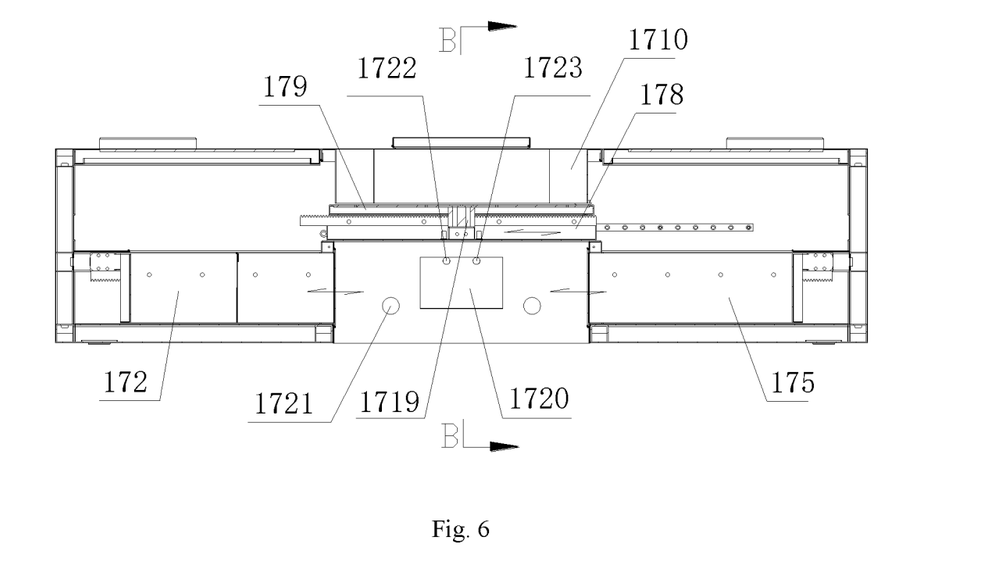
FIG. 6 shows the section view in A-A direction in FIG. 5.
Figure 7:
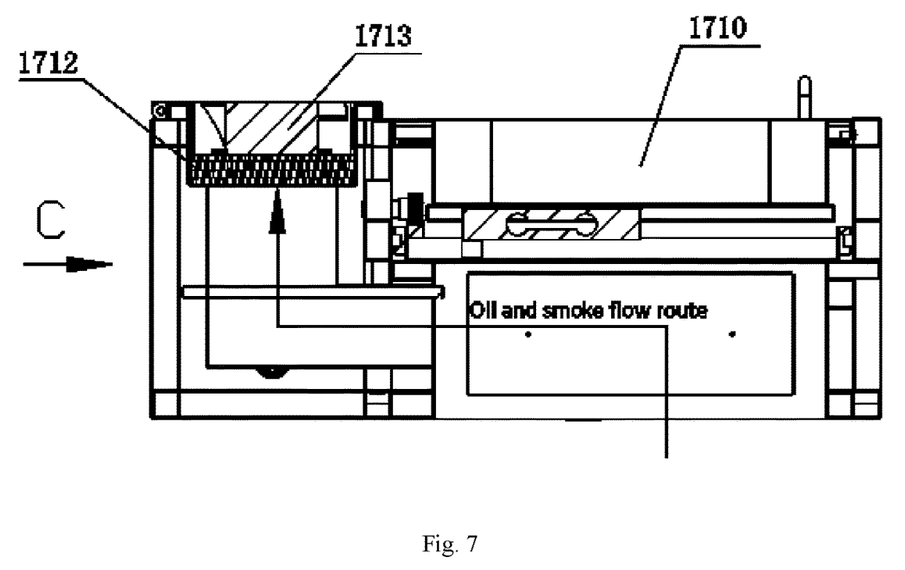
FIG. 7 shows is the section view in B-B direction in FIG. 6.
Figure 8:
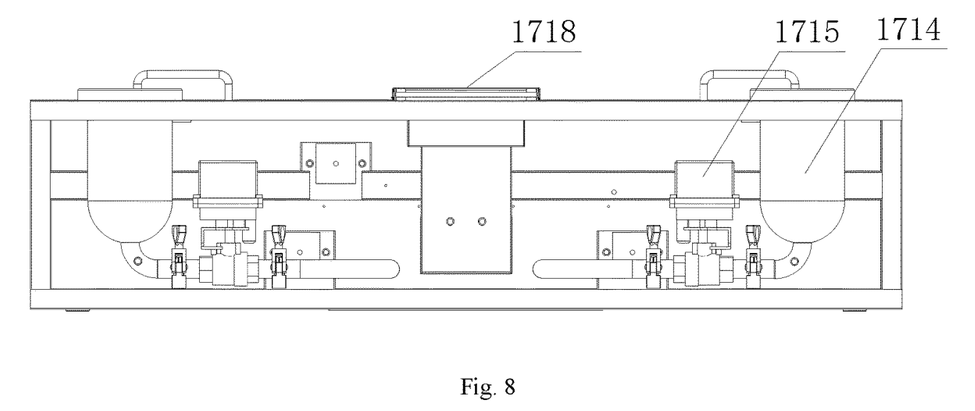
FIG. 8 shows the view in C direction in FIG. 7.
Figure 9:
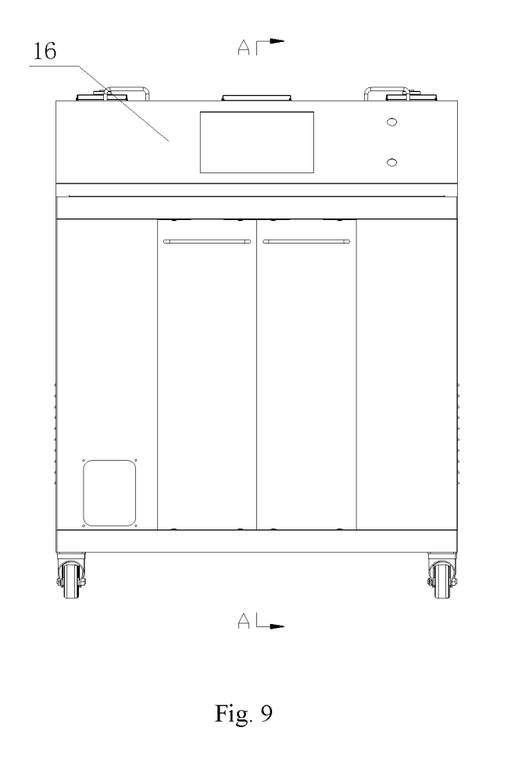
FIG. 9 shows the front view in FIG. 1.
Figure 10:
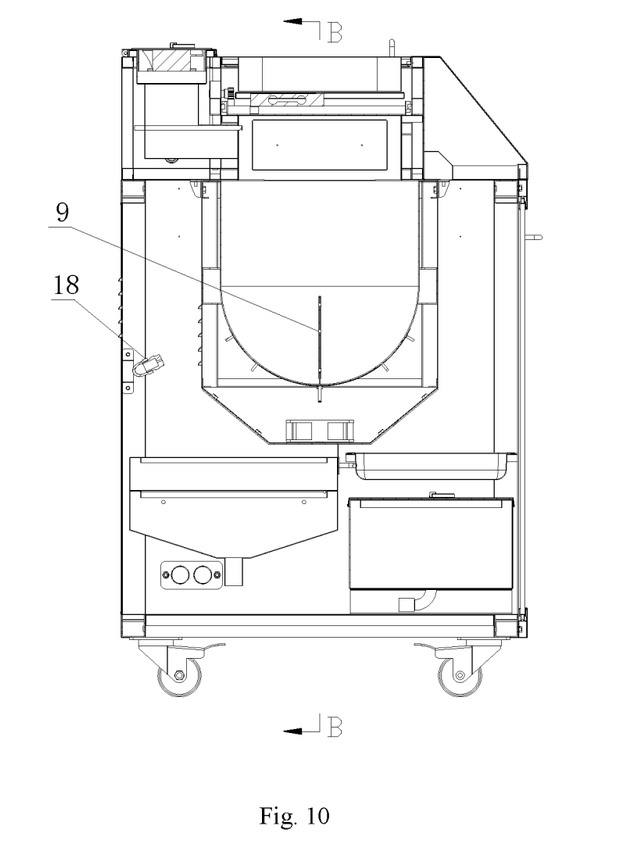
FIG. 10 shows the section view in A-A direction in FIG. 9.
Figure 11:
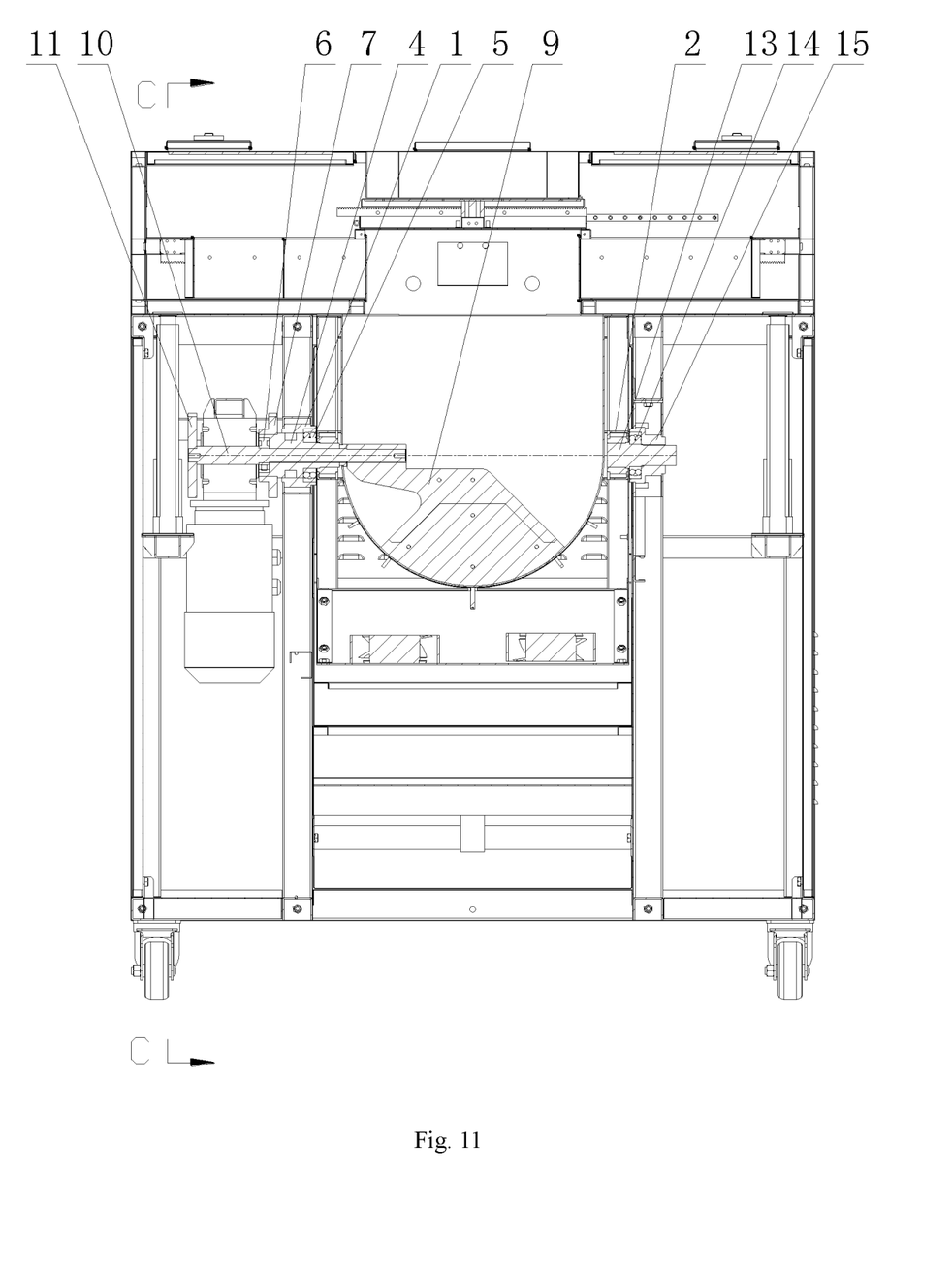
FIG. 11 shows the section view in B-B direction in FIG. 10.
Figure 12:
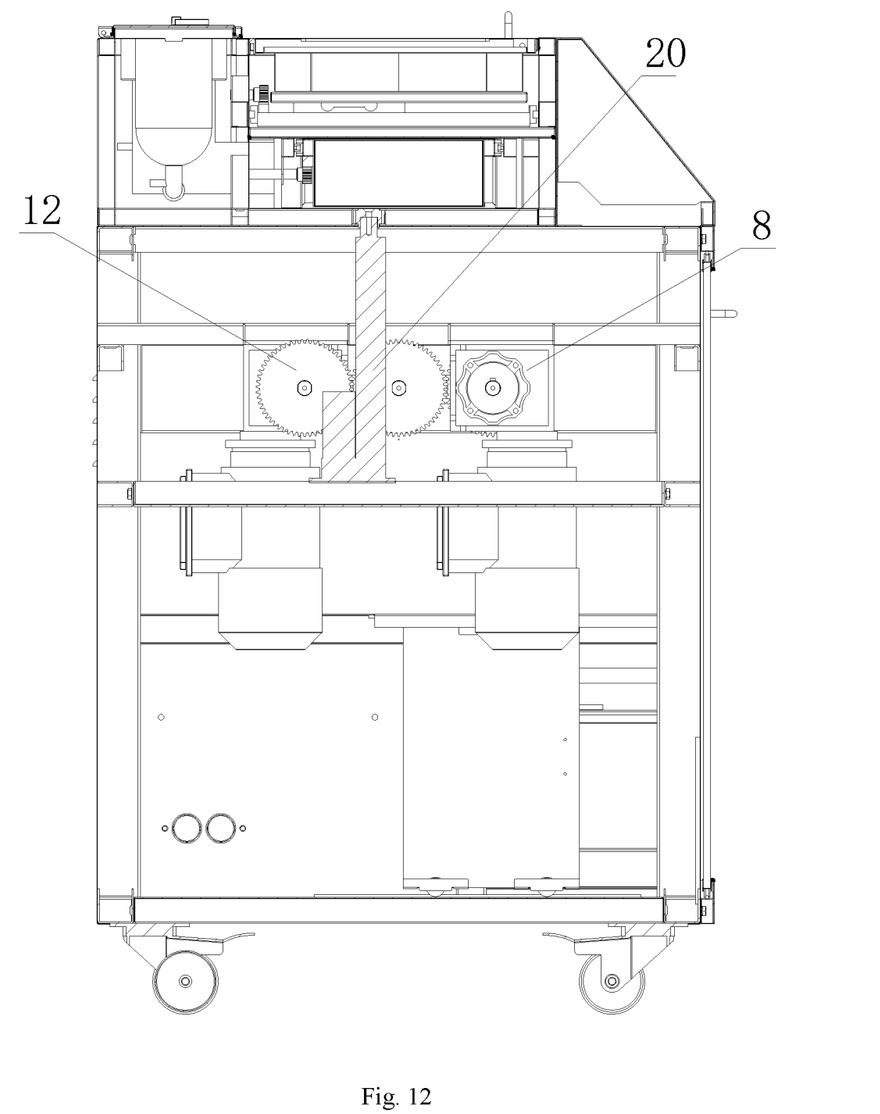
FIG. 12 shows the section view in C-C direction in FIG. 11.

As an example, the intelligent cooking machine of the embodiment, as shown in FIGS. 1-3, comprises a touch screen workbench assembly 16, a top cover assembly 17 and a base assembly. The workbench assembly 16 and the top cover assembly 17 are arranged in sequence in the front-back direction and are both located at the top of the base assembly.

Specifically, the workbench assembly 16 is fixed on the rack assembly 1, and a touch screen, a power switch and a start-stop switch are arranged on the outer surface of the workbench assembly 16. The workbench assembly 16 is used for controlling the start/stop, operation time and sequence of mechanisms of the cooking machine as a whole. When the power switch is pressed in use, the touch screen will be lighten up and the cooking options will be displayed, such as cooking procedures (e.g., stir-frying, stewing and deep-frying), cooking duration and the material feeding sequence. Once selected, press the start-stop switch, cooking will start.

The top cover assembly 17 is connected with the base assembly through electric lifting rods 20. Specifically, one ends of the two electric lifting rods are fixedly arranged on the left and right sides in the rack assembly 1, the other ends thereof extend out of the top surface of the rack assembly 1, and are fixedly connected with the left bottom and right bottom of the top cover assembly 17, the electric lifting rods 20, as operation mechanisms, are controlled by the workbench assembly 16, and allow the top cover assembly 17 to move upward and downward relative to the rack assembly 1. The structure reduces the space required for the top cover assembly 17 and also facilities storage of oil, dressing, sauce and other raw materials in the top cover assembly 17, thus avoiding spilling and scattering of the raw materials.

Specifically, as shown in FIGS. 4-8, the top cover assembly 17 comprises a top cover rack assembly 171, a left material feeding box frame 172, a main material feeding box frame 1710 and a right material feeding box frame 175 which are cut through vertically are arranged from left to right in front of the top cover rack assembly 171 relative to the front part of the top cover assembly 17, forming upper and lower layers connected through the material feeding box edge sealing cover plate 176.

The left material feeding box frame 172 and the right material feeding box frame 175 are located on the lower layer and are respectively connected with the top cover rack assembly 171 in a sliding way. Straight gear racks are fixed outside the left material feeding box frame 172 and the right material feeding box frame 175, to respectively match with the left material feeding box frame driving gear 173 and the right material feeding box frame driving gear 174 which respectively rotate under the control of independent motors connected with the workbench assembly 16, so as to shuttle between the material storage position and the material feeding position. When located at the material storage position, the left material feeding box frame 172 and the right material feeding box frame 175 will respectively be spliced with the complementary material feeding box bottom plate fixed at the material storage position to form cavities for containing the complementary materials. A plurality of left cavities are formed in the embodiment by arranging vertical baffle plates, and can be used to store complementary materials to be fed in sequence. The complementary materials are preferably implemented as garnishes, to realize the effect of automatic garnish feeding in sequence. Correspondingly, there's one cavity on the right, and it is preferably used to store garnishes. During the operation, with the left material feeding box frame 172 as an example, the workbench assembly 16 can drive the left material feeding box frame driving gear 173 to rotate through the independent motor according to the program, and thus drive the left material feeding box frame 172 to move from the material storage position to the material feeding position, so that an opening is gradually formed at the cavity bottom from the material feeding position to the material storage position. The complementary materials in the cavity move under the push by the left material feeding box frame 172, and thus fall into the pot via the opening formed at the cavity bottom. A movable material feeding box door 1711 is covered above the material storage position and is provided with an observation window. When the movable material feeding box door 1711 is closed, fume escape can be avoided. Arrangement of the observation window helps monitor the cooking and feeding state.

The main material feeding box frame 1710 is located on the upper layer which is also provided with a main material feeding box bottom plate 179. The main material feeding box bottom plate 179 is arranged on a weighing platform 178, and lateral slide-connecting devices (e.g., slide rails and slide blocks) are respectively arranged between the front and rear sides of the weighing platform 178 and the top cover rack assembly 171. A straight gear rack is laterally arranged on the top surface of the weighing platform 178 and is meshed with a weighing platform driving gear 177. The independent motor driving the weighing platform driving gear 177 is controlled by the touch screen workbench assembly 16, so that the main material feeding box bottom plate 179 can slide laterally and form a cavity for containing the main materials together with the main material feeding box frame 1710. A feeding opening can gradually be formed at the cavity bottom through movement of the main material feeding box bottom plate 179, so as to realize automatic feeding of the main materials. A weight sensor 1719 arranged between the main material feeding box bottom plate 179 and the weighing platform 178 is used to send the monitored weight information to the control center of the touch screen workbench assembly 16, and the control center can comprehensively control the feeding amounts of the main materials, complementary materials, sauce, oil and dressing according to the weight information of main materials, so as to realize the effect of intelligent cooking.

The upper-lower layer structure, the lateral arrangement of the left material feeding box frame 172 and the right material feeding box frame 175, and the arrangement of the main material feeding box frame 1710 in the middle, allow the operations of the left material feeding box frame 172 and the right material feeding box frame 175 and that of the main material feeding box bottom plate 179 and the weighing platform 178 to be mutually independent, with no mutual influence, reasonable structure and better simulated cooking effect. More importantly, when the left material feeding box frame 172, the right material feeding box frame 175, the main material feeding box bottom plate 179 and the weighing platform 178 are respectively at their own material storage positions, an enclosure of a fume containing cavity will be formed to avoid fume escape. The fume can be exhausted via an air exhaust port 1720 and an air outlet in sequence in a centralized way under the effect of the suction and exhaust of an air exhaust fan 1713. A cotton filter 1712 is arranged in a pipeline with connected air exhaust port 1720 and the air outlet, so as to filter the fume and protect the air environment. During the implementation, an air exhaust pipe led to the outdoor can also be connected to the air outlet.

Further as shown in FIGS. 4-8, a left sauce storage tank 1714, an air outlet and a right sauce storage tank are arranged from left to right at the rear part of the top cover assembly 17, wherein a left sauce storage tank cover 1716 is covered above the left sauce storage tank 1714, an air exhaust fan 1713 is arranged at the air outlet, and an air outlet cover 1718 which can be opened is covered on the air outlet. With the left sauce storage tank 1714 as an example, the bottom of the left sauce storage tank 1714 is communicated with a sauce outlet 1721 through a pipeline which is provided with an electric valve 1715, and the electric valve 1715 is independently controlled by the control system of the touch screen workbench assembly 16. According to the same principle, oil and dressing can respectively flow out of an oil injection outlet 1722 and a dressing injection outlet 1723, and then fall into the cooking pot 3. When not in use, by closing the cover of the sauce storage tank, the air outlet cover 1817 and the movable material feeding box door 1711, and using the respectively material storage positions of various components, the cooking pot 3 below can be kept clean and sanitary.

As shown in FIG. 3 and FIGS. 9-12, the base assembly comprises a rack assembly 1, a food discharging door 21 which can be opened is arranged in front of the rack assembly 1 to help put and take a food basin 24. When place the food basin 24, it can be fixed through a supporting frame arranged in the rack assembly 1, so that the food basin 24 can be located at a position corresponding to the food dumping position of the cooking pot 3. Air inlets are arranged at the two sides of the rack assembly 1 to help exhaust fume during the cooking. A cooking pot connecting frame 2 is arranged in the rack assembly 1 at a position corresponding to the top cover assembly 17 and is sleeved outside the cooking pot 3. The cooking pot connecting frame 2 and the cooking pot 3 are connected and fixed at the pot edge flange. A heating device is fixed in the cavity between the cooking pot connecting frame 2 and the cooking pot 3, for instance, an electric heating device which is independently controlled by the control system of the touch screen workbench assembly 16.

A cooking pot rotation driving reduction motor 8 and a spatula rotation driving reduction motor 12 are also fixed in the rack assembly 1 and are independently controlled by the control system of the touch screen workbench assembly 16, wherein the cooking pot rotation driving reduction motor 8 is meshed with a cooking pot rotation driving gear 7, the spatula rotation driving reduction motor 12 is meshed with a spatula rotation driving gear 11, the cooking pot rotation driving gear 7 and the spatula rotation driving gear 11 are arranged in the same axial line, the cooking pot rotation driving gear 7 drives the cooking pot 3 to swing via a cooking pot driving shaft 4, and a cooking pot driving shaft bearing 5 is arranged between the cooking pot driving shaft 4 and the cooking pot connecting frame 2; The cooking pot rotation driving gear 7 and the cooking pot driving shaft 4 are movably sleeved outside a spatula driving shaft 10, one end of the spatula driving shaft 10 is connected with the spatula rotation driving gear 11, and the other end thereof extends into the cooking pot 3 and is connected with a spatula assembly 9; a spatula driving shaft bearing 6 is arranged between the spatula driving shaft 10 and the cooking pot 3, a right driving shaft 14 is coaxially arranged at the other side of the cooking pot connecting frame 2 with the above mentioned axial line, one end of the right driving shaft 14 is connected with the cooking pot connecting frame 2 through a right driving shaft bearing 13, and the other end thereof is connected with a right driving shaft bearing seat 15 which is fixed on the inner surface of the rack assembly 1. The cooking pot rotation driving reduction motor 8 and the spatula rotation driving reduction motor 12 are centralized at one side, which not only makes full use of space and greatly reduces the machine size, but also enables centralized installation of mechanical execution elements and electric control elements simultaneously, leading to convenient installation and maintenance as well as improved product safety.

Figure 13:
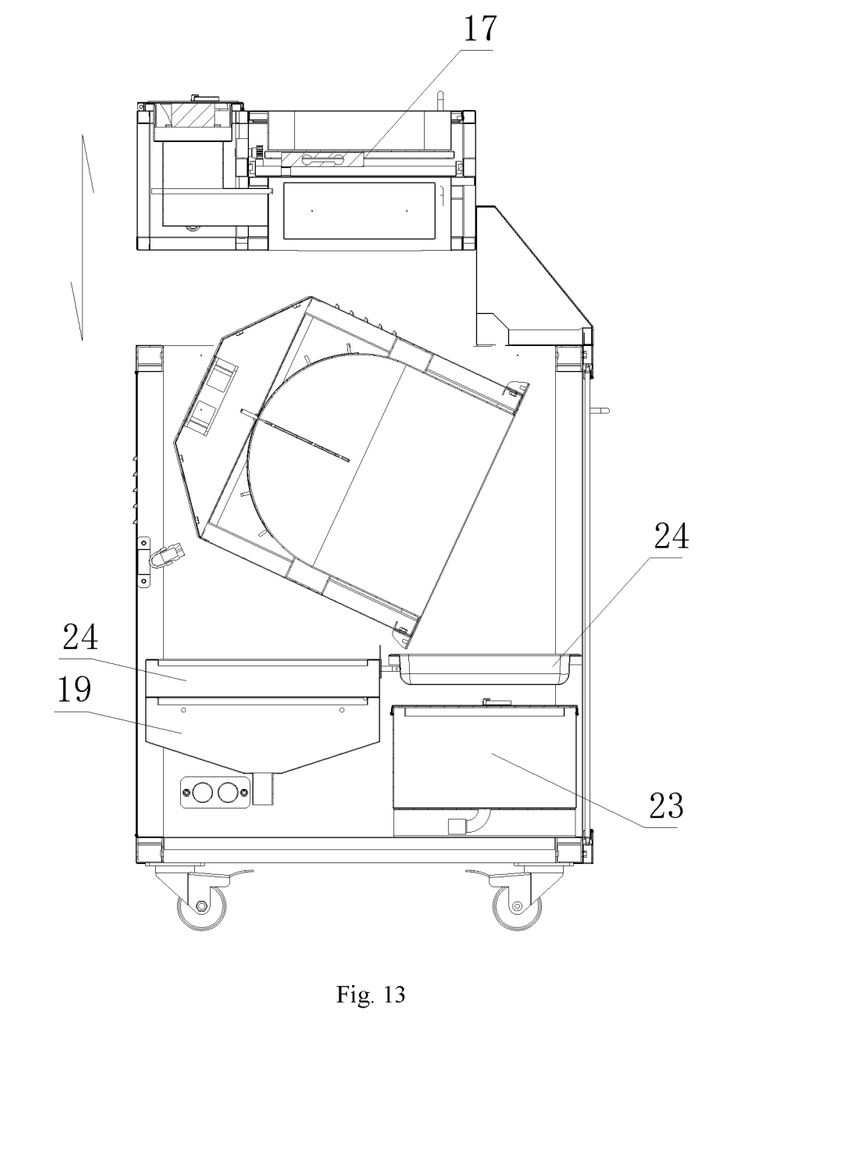
FIG. 13 shows the structural diagram of the food dumping state of the embodiment of the invention.
Figure 14:
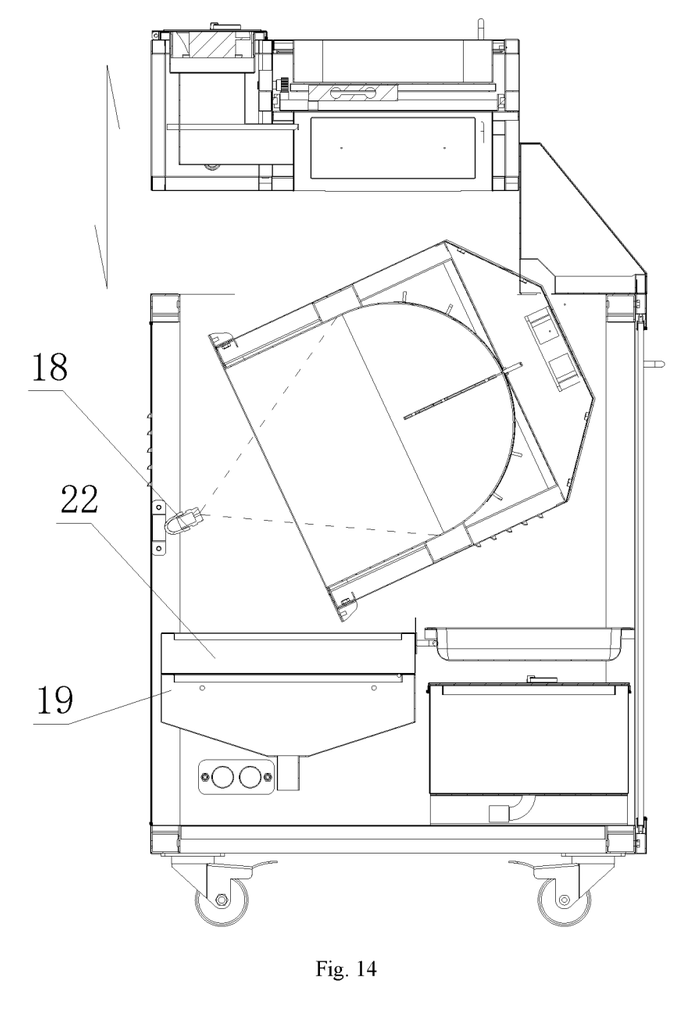
FIG. 14 shows the structural diagram of the cleaning state of the embodiment of the invention.

As shown in FIGS. 13-14, when food needs to be dumped or the pot needs to be cleaned, the electric lifting rods 20 will move upward to lift the top cover assembly 17, so as to observe and rotate the cooking pot 3. When the cooking pot 3 is rotated to the food dumping position, food will be contained by the food basin 24, and the space below the food basin 24 can be used to store a dressing storage tank 23. The dressing can also be added by sucking the dressing in the dressing storage tank 23. When the cooking pot 3 is rotated to the cleaning position, the opening of the cooking pot 3 will be directed toward a nozzle cleaning assembly 18 on the inner surface of the rack assembly 1, the nozzle cleaning assembly 18 is connected with a water supply pipe and is independently controlled by the control system of the touch screen workbench assembly 16. When the nozzle cleaning assembly 18 injects water, the spatula assembly 9 will rotate or swing correspondingly to realize automatic cleaning. A water collecting tank 19 is arranged below the edge of the cooking pot 3, and the bottom end of the water collecting tank 19 extends outside the rack assembly 1 through a pipeline to discharge water. A food dreg collecting tray 22 is arranged on the water collecting tank 19 to block food dregs.

It shall be understood that improvements and modifications may be made by one of ordinary skill in the technical field, without departing from the protection scope of the attached claims of the invention.

The invention patent is described schematically hereinabove. Apparently, realization of the invention is not limited to the above-mentioned implementation. Various improvements using the method conception and technical scheme of the invention patent, and direct application of the method conception and technical scheme of the invention patent to other situations without making any improvements, all fall in the protection scope of the invention.

The invention is not limited by the embodiments described above which are presented as examples only but can be modified in various ways within the scope of protection defined by the appended patent claims.

What is claimed is:

1. An intelligent cooking machine comprising a top cover device, a base and a main control device, wherein the top cover device is located above the base and is provided with a main material feeding device, a complementary material feeding device, a sauce feeding device, a cooking oil feeding device and a dressing feeding device, the main material feeding device is provided with a weighing sensor, and the weighing sensor is connected with the main control device to generate weight information of main materials contained in the main material feeding device and to allow the main control device to comprehensively control the feeding devices, wherein the top cover device is connected with the base through a lifting device, and the main control device allows the top cover device to move upward or downward relative to the base through the lifting device.

2. The intelligent cooking machine according to claim 1 wherein a cooking pot connecting frame, a cooking pot, a spatula, a first motor, a second motor, a first driving device, a second driving device and a fixed shaft are arranged in the base; the cooking pot connecting frame is sleeved outside and fixes the cooking pot the form a pot body, the spatula is located in the cooking pot, the first and second motors are fixed relative to the base and respectively and independently controlled by the main control device, the first motor drives the pot body to move through the first driving device, the second motor drives the spatula to move through the second driving device, the driving shafts of the first and second driving devices and the fixed shaft are respectively connected with the two ends of the pot body and are arranged in the same axial line, and the driving shaft of the first driving device is movably sleeved outside the driving shaft of the second driving device.

3. The intelligent cooking machine according to claim 1 wherein the main material feeding device comprises a main material feeding box frame, a main material feeding box bottom plate, a weighing platform and a main material feeding box driving device; the main material feeding box frame is cut through vertically, the main material feeding box bottom plate is arranged on the weighing platform and located below the main material feeding box frame, the weighing sensor is located between the main material feeding box bottom plate and the weighing platform, and the main control device enables the weighing platform to slide relative to the main material feeding box frame through the main material feeding box driving device, so that the main material feeding box bottom plate moves slowly to open or close the bottom opening of the main material feeding box frame.

4. The intelligent cooking machine according to claim 1 wherein the complementary material feeding device comprises a complementary material feeding box frame, a complementary material feeding box bottom plate and a complementary material feeding box driving device; the complementary material feeding box frame is cut through vertically, the complementary material feeding box bottom plate is fixed relative to the top cover device and located below the complementary material feeding box frame, the main control device enables the complementary material feeding box frame to slide relative to the complementary material feeding box bottom plate through the complementary material feeding box driving device, so that the complementary material feeding box bottom plate moves slowly to open or close the bottom opening of the complementary material feeding box frame.

5. The intelligent cooking machine according to claim 2 wherein the first and second motors are located on the same side of the pot body.

6. The intelligent cooking machine according to claim 4 wherein the intelligent cooking machine also comprises a baffle plate which is vertically arranged in the complementary material feeding box frame.

7. The intelligent cooking machine according to claim 2 wherein the intelligent cooking machine also comprises a nozzle cleaning assembly which is located in the base at the cleaning position of the pot body and is controlled by the main control device.

8. The intelligent cooking machine according to claim 1, wherein a fume containing cavity is arranged at the bottom of the top cover device and communicated with the outside through a fume pipeline, the fume pipeline is provided with a filtering device and an air exhausting device, and the air exhausting device is controlled by the main control device.

9. An intelligent cooking machine comprising a top cover device, a base and a main control device, wherein the top cover device is located above the base and is provided with a main material feeding device, a complementary material feeding device, a sauce feeding device, a cooking oil feeding device and a dressing feeding device, the main material feeding device is provided with a weighing sensor, and the weighing sensor is connected with the main control device to generate weight information of main materials contained in the main material feeding device and to allow the main control device to comprehensively control the feeding devices, wherein a cooking pot connecting frame, a cooking pot, a spatula, a first motor, a second motor, a first driving device, a second driving device and a fixed shaft are arranged in the base; the cooking pot connecting frame is sleeved outside and fixes the cooking pot the form a pot body, the spatula is located in the cooking pot, the first and second motors are fixed relative to the base and respectively and independently controlled by the main control device, the first motor drives the pot body to move through the first driving device, the second motor drives the spatula to move through the second driving device, the driving shafts of the first and second driving devices and the fixed shaft are respectively connected with the two ends of the pot body and are arranged in the same axial line, and the driving shaft of the first driving device is movably sleeved outside the driving shaft of the second driving device.

10. The intelligent cooking machine according to claim 9 wherein the first and second motors are located on the same side of the pot body.

11. The intelligent cooking machine according to claim 9 wherein the intelligent cooking machine also comprises a nozzle cleaning assembly which is located in the base at the cleaning position of the pot body and is controlled by the main control device.

12. An intelligent cooking machine comprising a top cover device, a base and a main control device, wherein the top cover device is located above the base and is provided with a main material feeding device, a complementary material feeding device, a sauce feeding device, a cooking oil feeding device and a dressing feeding device, the main material feeding device is provided with a weighing sensor, and the weighing sensor is connected with the main control device to generate weight information of main materials contained in the main material feeding device and to allow the main control device to comprehensively control the feeding devices, wherein the main material feeding device comprises a main material feeding box frame, a main material feeding box bottom plate, a weighing platform and a main material feeding box driving device; the main material feeding box frame is cut through vertically, the main material feeding box bottom plate is arranged on the weighing platform and located below the main material feeding box frame, the weighing sensor is located between the main material feeding box bottom plate and the weighing platform, and the main control device enables the weighing platform to slide relative to the main material feeding box frame through the main material feeding box driving device, so that the main material feeding box bottom plate moves slowly to open or close the bottom opening of the main material feeding box frame.

13. An intelligent cooking machine comprising a top cover device, a base and a main control device, wherein the top cover device is located above the base and is provided with a main material feeding device, a complementary material feeding device, a sauce feeding device, a cooking oil feeding device and a dressing feeding device, the main material feeding device is provided with a weighing sensor, and the weighing sensor is connected with the main control device to generate weight information of main materials contained in the main material feeding device and to allow the main control device to comprehensively control the feeding devices, wherein the complementary material feeding device comprises a complementary material feeding box frame, a complementary material feeding box bottom plate and a complementary material feeding box driving device; the complementary material feeding box frame is cut through vertically, the complementary material feeding box bottom plate is fixed relative to the top cover device and located below the complementary material feeding box frame, the main control device enables the complementary material feeding box frame to slide relative to the complementary material feeding box bottom plate through the complementary material feeding box driving device, so that the complementary material feeding box bottom plate moves slowly to open or close the bottom opening of the complementary material feeding box frame.

14. The intelligent cooking machine according to claim 13 wherein the intelligent cooking machine also comprises a baffle plate which is vertically arranged in the complementary material feeding box frame.

15. An intelligent cooking machine comprising a top cover device, a base and a main control device, wherein the top cover device is located above the base and is provided with a main material feeding device, a complementary material feeding device, a sauce feeding device, a cooking oil feeding device and a dressing feeding device, the main material feeding device is provided with a weighing sensor, and the weighing sensor is connected with the main control device to generate weight information of main materials contained in the main material feeding device and to allow the main control device to comprehensively control the feeding devices, wherein a fume containing cavity is arranged at the bottom of the top cover device and communicated with the outside through a fume pipeline, the fume pipeline is provided with a filtering device and an air exhausting device, and the air exhausting device is controlled by the main control device.

* * * * *